United States Patent
Ternasky et al.

(10) Patent No.: US 7,392,533 B2
(45) Date of Patent: Jun. 24, 2008

(54) SYSTEM AND METHOD FOR MANAGEMENT OF A COMPONENTIZED ELECTRONIC DOCUMENT RETRIEVABLE OVER A NETWORK

(75) Inventors: Joseph D. Ternasky, Mountain View, CA (US); Robert L. C. Parker, San Jose, CA (US); Michael M. Byrd, Bellevue, WA (US); Adam Eversole, Redmond, WA (US); Joseph King, Seattle, WA (US); Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 10/848,071

(22) Filed: May 19, 2004

(65) Prior Publication Data

US 2005/0262243 A1 Nov. 24, 2005

(51) Int. Cl.
- *G06F 7/04* (2006.01)
- *G06F 17/30* (2006.01)
- *G06K 9/00* (2006.01)
- *H04L 9/32* (2006.01)

(52) U.S. Cl. .......................................... 726/2; 371/111
(58) Field of Classification Search ................ 713/170, 713/166; 726/2; 702/123; 707/9
See application file for complete search history.

(56) References Cited

U.S. PATENT DOCUMENTS

| | | | | | |
|---|---|---|---|---|---|
| 5,504,818 | A | * | 4/1996 | Okano | 713/166 |
| 5,717,755 | A | * | 2/1998 | Shanton | 713/166 |
| 5,974,548 | A | * | 10/1999 | Adams | 713/186 |
| 6,598,161 | B1 | * | 7/2003 | Kluttz et al. | 713/166 |
| 2002/0090934 | A1 | * | 7/2002 | Mitchelmore | 455/412 |
| 2003/0051144 | A1 | * | 3/2003 | Williams | 713/178 |

* cited by examiner

*Primary Examiner*—Kambiz Zand
*Assistant Examiner*—Dant B Shaifer Harriman
(74) *Attorney, Agent, or Firm*—Shook, Hardy & Bacon, LLP

(57) ABSTRACT

A system and related techniques detect and manage the set of rights associated with a componentized electronic document, including to separately protect and manage individual text, graphic, audio, video or other parts of a multimedia presentation. Unlike prior digital asset management platforms which could enforce encryption or other protection simply around the entire object, the invention permits individualized control over separate media components, to permit distribution for example of some parts, such as text passages, while preventing unauthorized access or copying of audio, photographic, video or other files or content. The electronic document may maintain a list of media components and the set of rights associated with each such component, and a content server or other source may apply key encryption or other safeguards to guide the delivery of the overall media object or its parts, for instance to view in a browser, print on a printer or otherwise access, manipulate or output the content.

26 Claims, 5 Drawing Sheets

SYSTEM AND METHOD FOR MANAGEMENT OF A COMPONENTIZED ELECTRONIC DOCUMENT RETRIEVABLE OVER A NETWORK

CROSS-REFERENCE TO RELATED APPLICATION

The subject matter of this application is related to the subject matter of U.S. patent application Ser. No. 10/836,327 filed Apr. 30, 2004, entitled "Document Markup Methods and Systems", which application is assigned or under obligation of assignment to the same entity as this application, and which application is incorporated by reference herein.

STATEMENT REGARDING FEDERALLY SPONSORED RESEARCH OR DEVELOPMENT

Not applicable.

FIELD OF THE INVENTION

The invention relates to the field of information processing, and more particularly to the management of digital rights in electronic documents having multiple components.

BACKGROUND OF THE INVENTION

The ease with which digital music, books and other written content, digital photographs and graphics, digitized video and other media and content may be shared, stored and retransmitted has highlighted the challenge of copyright and other ready rights management in the Internet era. While authors, composers, artists and others can take advantage of certain digital rights management (DRM) or digital asset management (DAM) technologies and platforms today, those approaches have drawbacks and limitations.

For example, photographers, publishers and others may retain or attempt to retain the rights in digital photographs posted on the Internet through embedded digital rights metadata inserted into image files such as TIFF, JPEG or other formats. In such cases, the original artist or other rights holder may embed an image header with date, file size and possibly encryption or password-protection data, to prevent the unauthorized use or reproduction of the graphical or other work. Thus, members of the viewing public may not be able to use a browser to save a copyrighted news photograph to their hard drives without a passcode or encryption key, for example.

However, even platforms which are aware of provisioning rights and include mechanisms to enforce copy protection may be insufficiently sophisticated to manage digital works which are more than simple texts or unitary images. For example, a news or other media Web site may present up-to-date stories in a more flexible format including text, associated photographs inserted in the story at a designed point, clickable audio clips, or streamed or other video or other media components. There is no way to effectively protect and manage the various modular parts of such a media object in an independent fashion.

That is, even if current rights management schemes may or could be extended to multimedia news or other Web presentations, the viewer of that content mat or would be limited to an encryption key or other mechanism which would merely lock or unlock the overall combination of media components in monolithic fashion, as illustrated in FIG. 1. Separate components of that content, such as individual photographs, sections or chapters of texts, video clips or other components, could not be accessed, checked out, copied or otherwise processed individually.

Because the constituent parts of the content can not be individually manipulated, the management and exploitation of rights in the overall media package may be constrained. For instance, a Web publisher or other may desire to make newspaper text redistributable but withhold the redistribution of associated video files, but this is impossible under current digital asset management platforms which place the entire object into an encrypted container. Other problems exist.

SUMMARY OF THE INVENTION

The invention overcoming these and other problems in the art relates in one regard to a system and method for digital rights management in an electronic document, in which the various media components in a media object, such as text, digital photographs or other images, audio samples, video clips or other content may be separately tracked and managed to preserve and manage the diverse rights in those components. In embodiments, the componentized electronic document may for example be served to a client machine from a content server. The electronic document may in embodiments contain an embedded list of the components making up the document, along with the associated, and possibly varying, sets of rights and privileges afforded to the individual components, for example to permit check in/check out to authorized or all users, to permit or prohibit the reproduction of digital photographs, or apply other rights, restrictions or privileges to those parts. For example the content server may remove parts of an electronic document before delivery to an unauthorized user or location. A parser in the recipient computer or other client device may likewise identify the associated rights and enforce or implement access and other privileges. In embodiments, the integrated rights management of the compound document may enhance and control the printing and other output activities of the content, for instance to prevent the unauthorized reproduction of protected works.

DETAILED DESCRIPTION OF EMBODIMENTS

Figure 1:
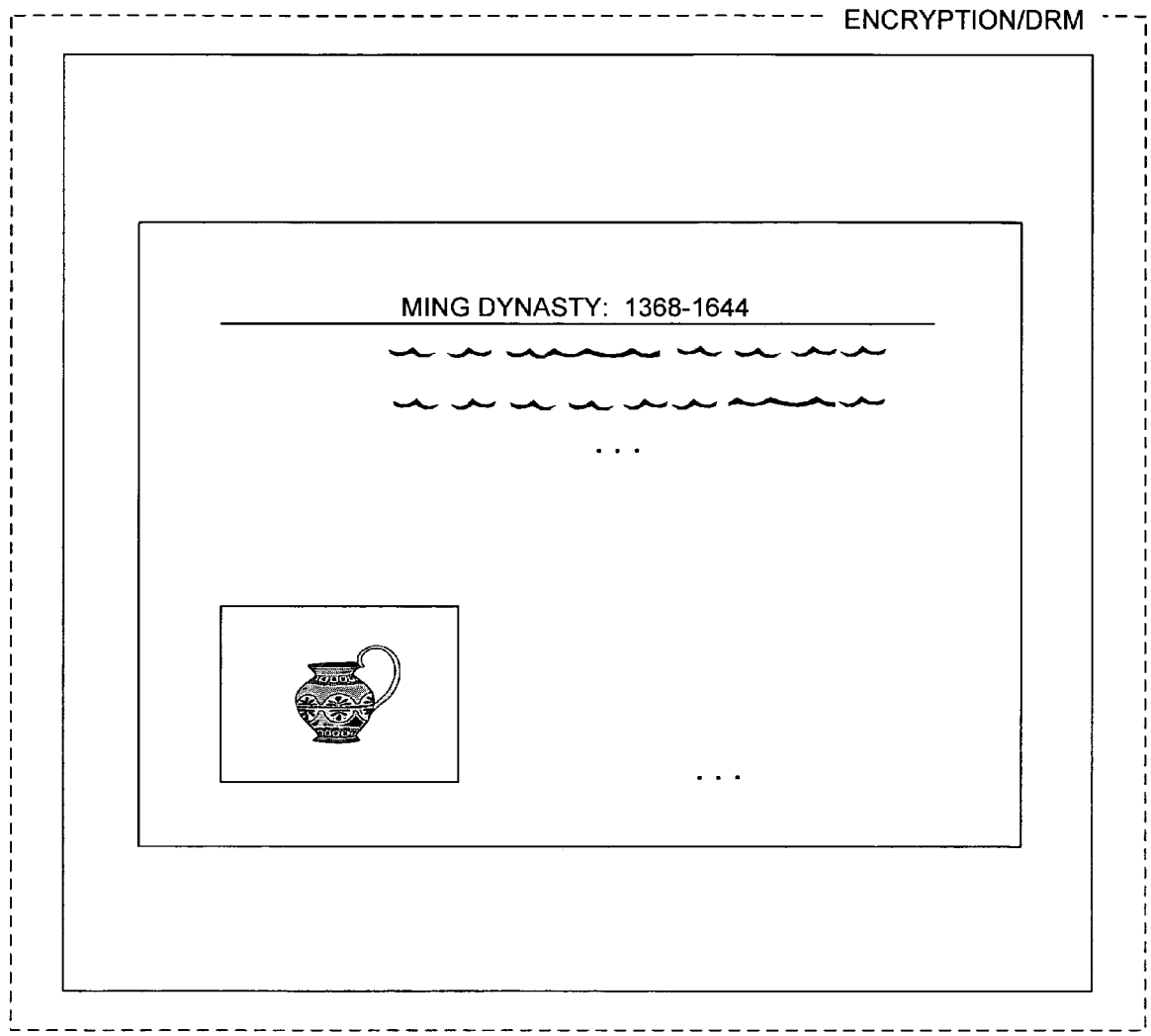
FIG. 1 illustrates a digital rights protection scheme, according to known technologies.
Figure 2:
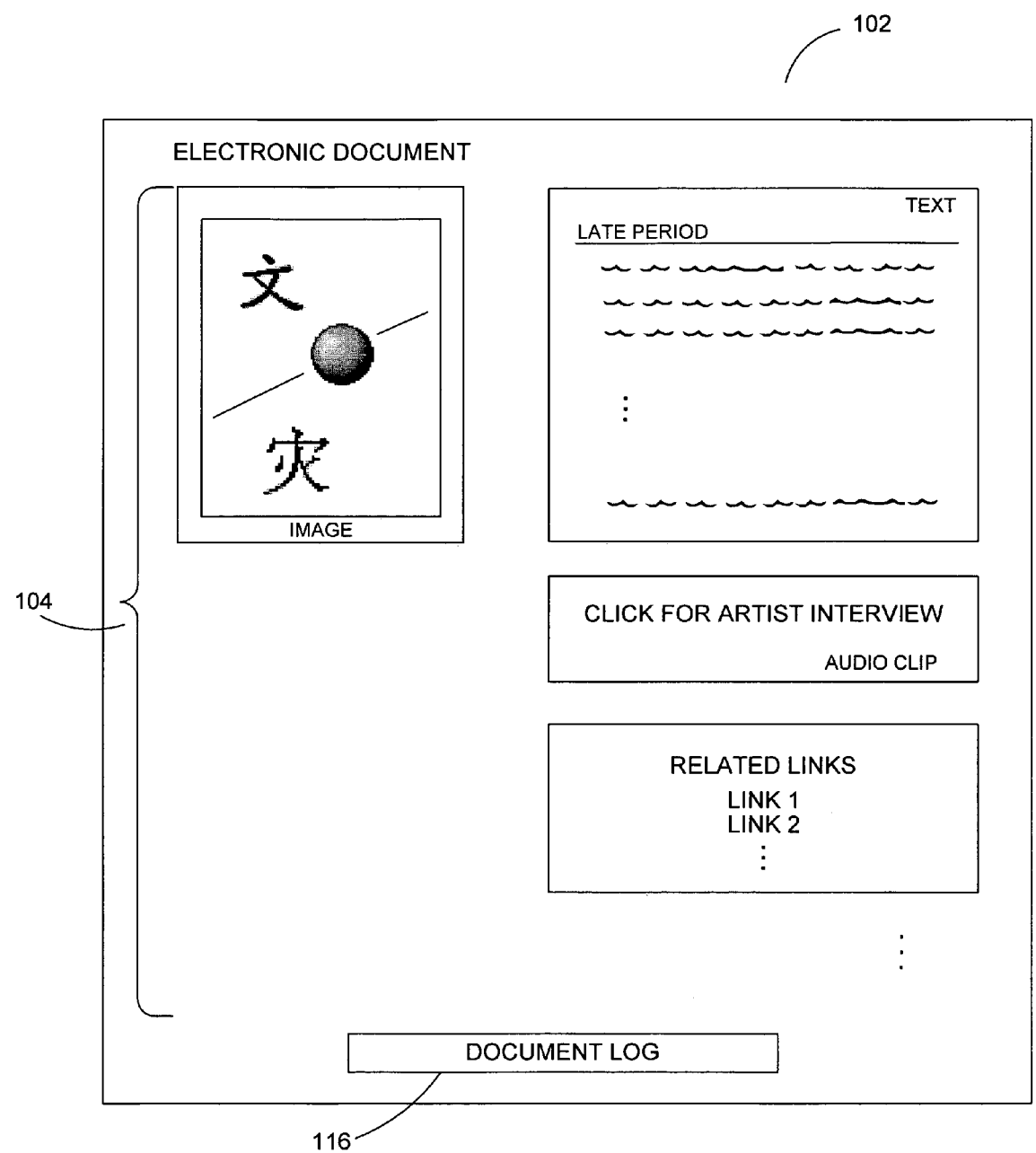
FIG. 2 illustrates an electronic document containing a diverse set of content components, according to an embodiment of the invention.

FIG. 2 illustrates an example of an electronic document 102 upon which access and rights management functions may be performed, according to embodiments of the invention. As shown in that figure, the electronic document 102 may in one regard be or include a componentized or otherwise multipart document or file, containing among other things a set of components 104. The set of components 104 may include, for example, text data such as ASCII, Microsoft Word™, Unicode or other character or textual information. Text data when stored in the set of components 104 may be presented in one or more languages, and may in embodiments be hosted within electronic document 102, or in embodiments stored in a linkable separate file or other resource. The set of components 104 may likewise include or incorporate other categories of files or data, including for example graphical images such as digital photographs or other image data, for instance stored in JPG, TIFF or other graphical file formats. The set of components 104 may further include other media or data, such as for example audio samples or clips such as Windows™ audio (WAV) files, MPEG3 or other formats. Similarly, the set of components 104 may include video samples or clips, for example data stored in Windows™ video (AVI) files, QuickTime™ or other video encoding formats. Other data, media or information may be included within the set of components 104.

Individual components of graphical, audio, video and other types as well as textual or character data may likewise be embedded within electronic document 102 itself, or on cases be accessed via network resources such as Universal Resource Locator (URL) links or other references. In those case electronic document 102 may for example be composed for editing, storage and other actions on an on-demand or other basis. As shown, electronic document 102 may furthermore contain a document log 1 16 to assist in the tracking and management of the individual components in the set of components 104 as they are requested, extracted, edited and returned by users, as described below. In embodiments the electronic document 102 may be, include or interface to an electronic document or file of the type described in copending U.S. patent application Ser. No. 10/836,327 filed Apr. 30, 2004, entitled "Document Markup Methods and Systems", or others.

Figure 3:
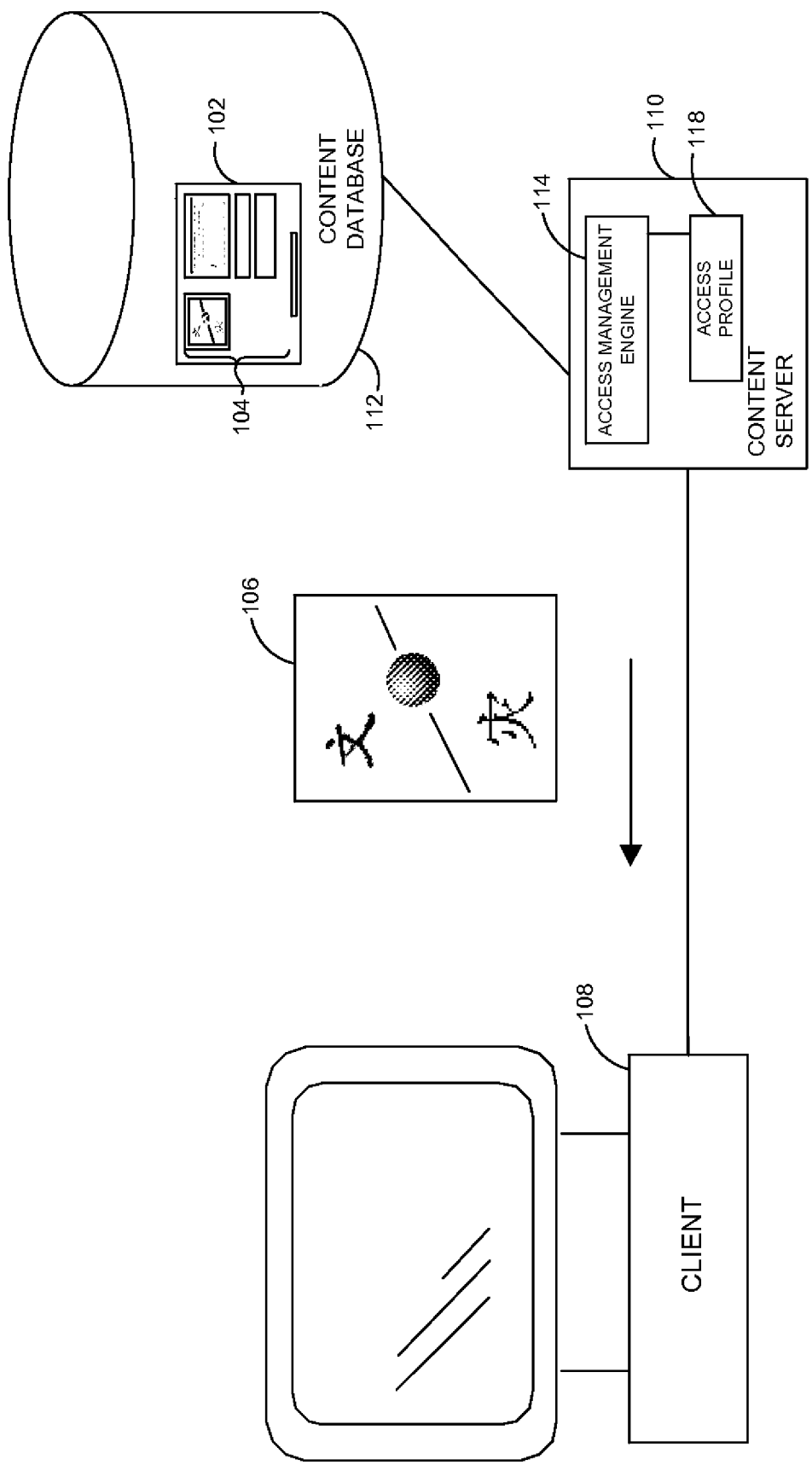
FIG. 3 illustrates a network environment in which a platform for digital rights management in an electronic document may operate, according to an embodiment of the invention.

FIG. 3 illustrates an architecture in which a system and method for management of a componentized electronic document may operate, according to an embodiment of the invention. As illustrated in that figure a user may operate a client 108 to communicate with content server 110, to request, access and return one or more electronic document 102. The client 108 may be or include a computer, a data-enabled cellular telephone, a network-enabled wireless device, or other device. The client 108 may communicate with the content server 110 through local or remote networking connections, such as a local area network (LAN), metropolitan area network (MAN), a wide area network (WAN), the Internet, or other wired, wireless, optical or other connections.

The content server 110 may communicate with a content database 112, which may store one or more electronic document 102. The content database 112 may in embodiments be, include or interface to a relational or other database engine, such as a standard query language (SQL) engine, with associated hard disk, optical disk or other storage and search logic. A user at client 108 may initiate a request for access to the electronic document 102, or one or more of the set of components 104, by transmitting a request or query to content server 110, for instance via applications such as a browser, a directory file service, a text or graphical editor, or other application or service. The request from client 108 may be received and processed by an access management engine 114 hosted in server 110, or otherwise.

Figure 4:
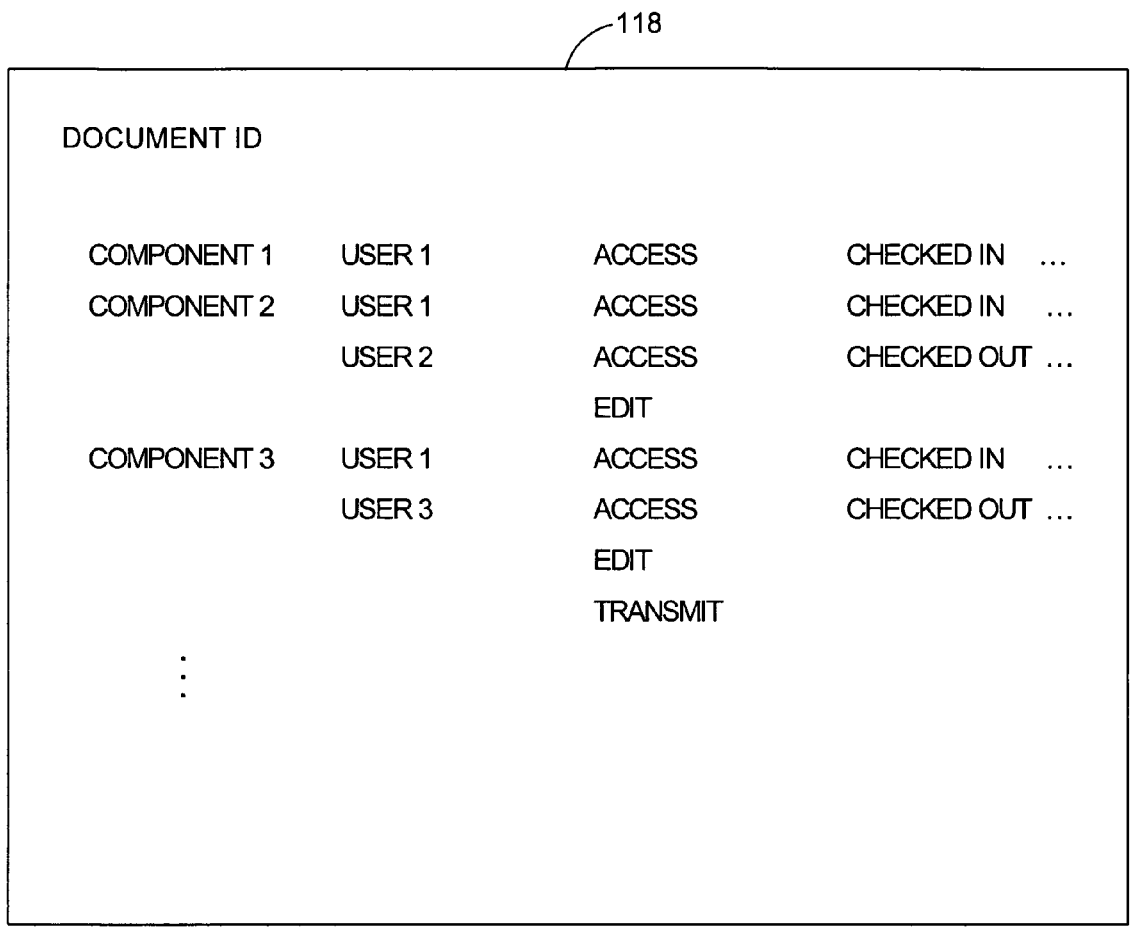
FIG. 4 illustrates an access profile for an electronic document, according to an embodiment of the invention.

The access management engine 114 may receive and authenticate the request for access to electronic document 102 or one or more of the set of components 104 thereof, in individualized fashion as appropriate to validate or decline access to specific components if requested. For example, the content server 110 may maintain an access profile 118 which records access rights for a given electronic document 102 and its various components in the set of components 104. For instance as illustratively shown in FIG. 4, the electronic document 102 may have multiple components, each of which has an associated set of authorized users along with levels or types of access, editing, retransmission, or other rights.

A user at client 108 may request, for example, retrieval of one chapter within an electronic document 102 such as a book, encyclopedia or other compilation or work. That user may then be authenticated against the access profile 118 for that electronic document 102 and the component within the set of components 104. For example, an editor of an encyclopedia or multipart magazine may wish to access and check out a specific chapter for editing, proofing, updating, or other processing. The access management engine 114 may validate the user's level of access privileges, and transmit the desired chapter, image, audio, video or other component to the client 108 as retrieved data 106, which could also in cases be the entire electronic document 102 when properly requested. For example, digital rights management or digital access management logic, tags or headers may be embedded in retrieved data 106 to allow or disallow copying, retransmission, printing or other outputting, to set a permitted check out time, or other management functions on the one or more component in the set of components 104, or electronic document 102 itself.

The access profile 118 maintained by content server 110 as well as document log 116 embedded within the electronic document 102 may include entries for the check-in/check-out or other status of the one or more components in the set of components 104, or electronic document 102 itself to maintain document integrity, since electronic document 102 may be accessed or retrieved by more than one user, at the same time or different times. Thus for example the access management engine 114 may prevent a second user from accessing a component in the set of components 104, even if the second user is authorized, to avoid inconsistent versions of components due to the alteration of multiple copies of the component.

The access management engine 114 may also perform merge operations on the electronic document 102 after one or more users has edited and returned one or more components in the set of components 104, to maintain a coherent and up to date image of electronic document 102. For example, edits to separate parts of a component which do not conflict or overlap may all be stored to an updated version of a component, while the access management engine 114 may force separate versions of the set of components 104 or the electronic document 102 to be generated when conflicted versions appear. Users may in embodiments also be queried to select to store a separate version of the set of components 104 or electronic document, to discard outdated or conflicting changes, to override conflicting changes if a user has higher access privileges, or take other action in the management and storage of electronic document 102 and constituent updates.

In embodiments the user at client 108 may request the electronic document 102 or one or more component in the set of components, including for purposes of printing or otherwise outputting the document or those components. In embodiments, after authentication the request may trigger the transmission of the electronic document 102 or one or more components in the set of components 104 directly to the client 108. In further embodiments, the electronic document 102 or requested components may be initially requested by or via a print device itself, such as a laser or inkjet printer, or delivered directly to the print device for conditioning and printing or other output. In such embodiments and others, the electronic document 102 or the one or more components in the set of components 104 may be requested, identified or referenced by way of a network address or other identifier, such as a URL or other link. By making the electronic document 102 and its components both visible to and retrievable by network users on a granular basis, workgroup efficiency may be enhanced since multiple users may access and work on multiple components of a single electronic document 102, while maintaining the rights management to all of the set of components 104 in coherent fashion.

Figure 5:
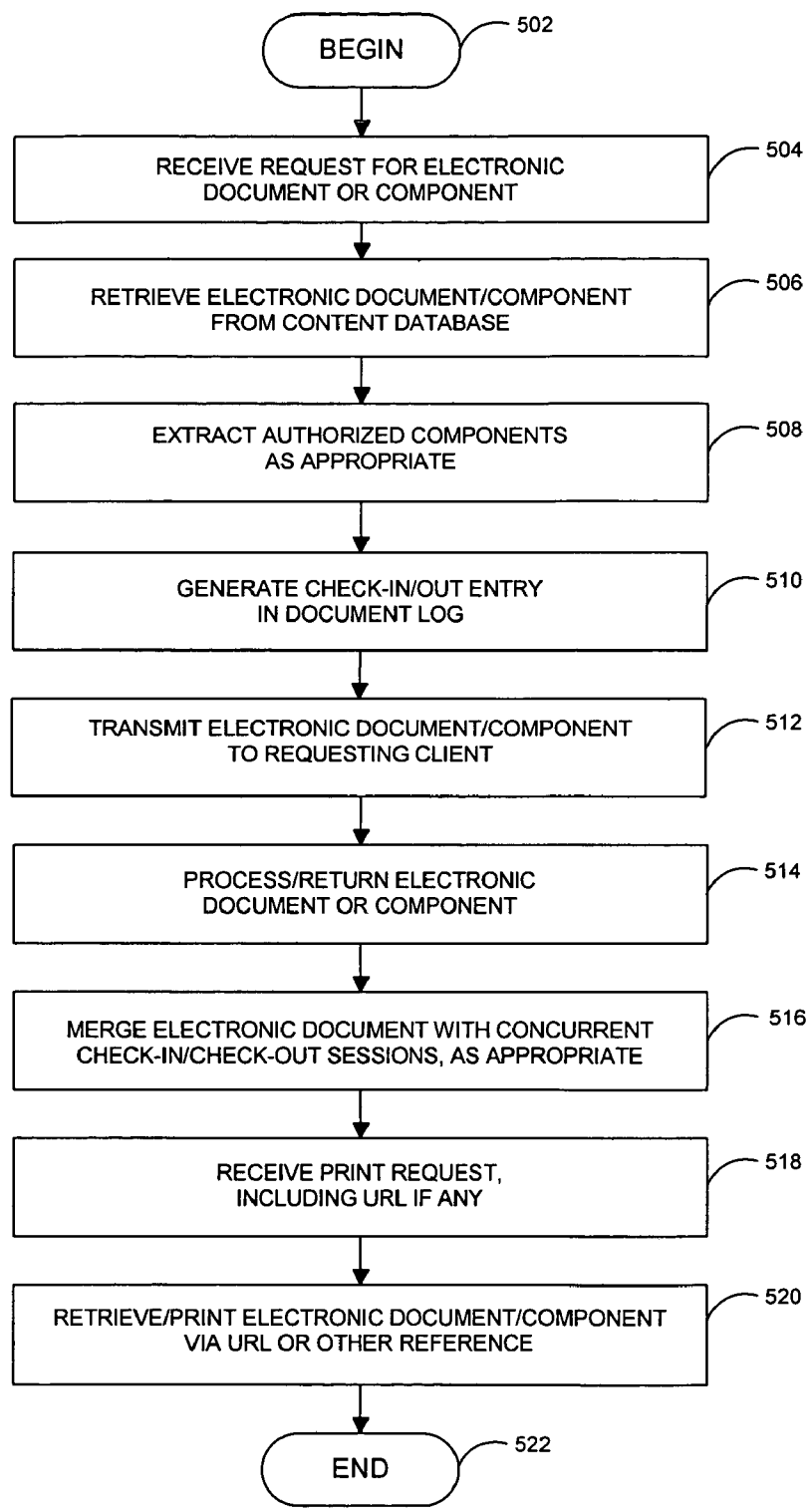
FIG. 5 illustrates a flowchart of overall rights and access management of an electronic document, according to an embodiment of the invention.

FIG. 5 illustrates overall retrieval and document management, according to an embodiment of the invention. In step 502, processing may begin. In step 504, a request to access the electronic document 102 or one or more components in the set of components 104 may be received in content server 110 or otherwise. In step 506, the electronic document or one or more components in the set of components 104 may be retrieved from content database 112 or other content source.

In step 508, the one or more components in the set of components 104 or entire electronic document 102 which may be authorized for access by the requesting user may be extracted. This may be done for example by checking access profile 118 to apply access privileges for a given user and selecting those components among the requested components which the user is authorized to access, but denying access to unauthorized components or the document itself when appropriate. In step 510, the check-in/check-out entry in the embedded document log 116 may be updated to reflect checked-out components in the set of components 104. In embodiments the access profile 118 may be similarly update to reflect that status. In step 512, the electronic document 102 or one or more components in the set of components 104 may be transmitted to client 108, as retrieved data 106.

In step 514, the electronic document 102 or one or more of the checked-out components may be processed, for example, textually or graphically edited, and returned to content server 110. In step 516, the content server 110 may merge the electronic document 102 or one or more returned components in the set of components 104 with the document or components from concurrent check-in/check-out sessions, as appropriate. For example, the merge may include updating and saving the components in set of components 104 which have not been altered, or which have been altered by only one user, to content database 112 while resolving multiply-edited components, for example by comparison logic or user query, for storage.

In step 518, the content server 110 may receive a print or other output request, for instance from client 108 or another requestor. The print request may include a URL identifying the electronic document 102 or one or more components in the set of components 104, for network retrieval and individual printing of the components or the entire document if desired. In step 520, the electronic document 102 or one or more components in the set of components 104 may be retrieved via a URL or other network or other address or reference. In step 522, processing may repeat, return to a prior processing point, proceed to other processing or end.

The foregoing description of the invention is illustrative, and modifications in configuration and implementation will occur to persons skilled in the art. For instance, while the invention has generally been described in terms of a platform in which electronic documents or other source files or information are served from a single content database, in embodiments electronic documents or components of those documents could be hosted and served from distributed databases, network connections or other resources.

Similarly, while the invention has in embodiments been described as a platform in which a single client requests, retrieves and returns electronic documents to the content source, in implementations users may exchange the electronic document or components thereof to other clients, users or other destinations, for instance using security-enabled peer-type file sharing arrangements, or otherwise. Other hardware, software or other resources described as singular may in embodiments be distributed, and similarly in embodiments resources described as distributed may be combined. Further, while the invention has been described as operating on the set of access and other rights associated with a single electronic document, in embodiments one or more user or client may be permitted to select and manipulate common or other components from multiple electronic documents, at the same time. Again, while the invention has in one regard been described as generating a controlled print output which manages access rights to various parts of an electronic document, in embodiments the platform may mange other output functions or types, such as facsimile transmission. The scope of the invention is accordingly intended to be limited only by the following claims.

We claim:

1. A computer system comprising a computer storage medium having a plurality of computer software components embodied thereon for managing access to a componentized electronic document via a network, the system comprising:
    an access profile module hosted in a server machine and configured to track a user's permissions to individual components of a componentized electronic document, wherein the user may be granted different permissions to different components;
    an access management engine hosted in a server, the access management engine configured to interact with the access profile module to authenticate a request received from the user at a client machine for access to individual document components, the access management engine further configured to grant a user different levels of editing access to different components, wherein editing access levels control the user's ability to change the component; and
    an interface to a content database, the access management engine configured to communicate with the interface to the content database to retrieve the components authenticated by the access management engine and to transmit the components to the user at the client machine.

2. A computer system according to claim 1, wherein the set of components comprises at least one of textual data, graphical data, audio data, video data and link data.

3. A computer system according to claim 1, wherein at least a plurality of the set of components have independent authentication criteria.

4. A computer system according to claim 1, wherein the access authentication comprises digital rights management processing.

5. A computer system according to claim 1, wherein the electronic document comprises a document log.

6. A computer system according to claim 5, wherein the content database maintains check-in or check-out data for one or more of the electronic document and individual components.

7. A computer system according to claim 6, wherein the access management engine performs a merge operation on the set of components based on at least the check-in or check-out data.

8. One or more computer-readable media having computer-executable instructions embodied thereon for performing a method for managing access to a componentized electronic document via a network, the method comprising:

receiving a request for access to one or more components within an electronic document having a set of components, the request being received from a client;

authenticating a proper level of access to at least one of the requested components based on a requestor's permission level for the component, wherein the proper level of access is determined at a server;

communicating with a content database to retrieve at least one of the components; and transmitting one or more authenticated components to the user at the client with embedded management logic configured to disallow one or more of copying, retransmission, and printing.

9. The one or more computer-readable media of claim 8, wherein the set of components comprises at least one of textual data, graphical data, audio data, video data and link data.

10. The one or more computer-readable media of claim 8, wherein at least a plurality of the set of components have independent authentication criteria.

11. The one or more computer-readable media of claim 8, wherein the authenticating comprises digital rights management processing.

12. The one or more computer-readable media of claim 8, wherein the electronic document comprises a document log.

13. The one or more computer-readable media of claim 12, further comprising updating at least check-in or check-out data in the document log.

14. The one or more computer-readable media of claim 13, further comprising performing a merge operation on the set of components based on at least the check-in or check-out data.

15. A method of managing changes to a componentized electronic document, the method comprising:

receiving a request for read-write access to an electronic document having a set of components, wherein read-write access allows a user to change the document content;

determining a read-write access status of the document component by checking with a document log, the document log configured to manage changes to individual document components;

authenticating read-write access to at least one of the components based on the read-write status and component permissions; and communicating with a content database to retrieve the at least one of the set of components.

16. A method according to claim 15, wherein the set of components comprises at least one of textual data, graphical data, audio data, video data and link data.

17. A method according to claim 15, wherein at least a plurality of the set of components have independent authentication criteria.

18. A method according to claim 15, wherein the method further comprises updating at least check-in or check-out data in the document log.

19. A method according to claim 18, further comprising performing a merge operation on the set of components based on at least the check-in or check-out data.

20. A method according to claim 15, wherein the method further comprises communicating the at least one component to an output device.

21. A method according to claim 20, wherein the output device comprises a printer.

22. A method of granting levels of editing access to a componentized electronic document and managing the changes to the componentized electronic document made by one or more users, the method comprising:

receiving a first request from a first user for read-write access to an electronic document having a set of components, wherein read-write access allows the user to change the document content;

determining the first user's read-write access status to the document component by checking with an access profile for the electronic document, wherein the access profile is configured to track user read-write access status to individual document components and is located in a content database;

transmitting an authenticated component of the electronic document from a content database to the first user;

changing the access profile to indicate that the authenticated component is checked out to the first user;

receiving a second request from a second user for read-write access to at least the authenticated component;

determining the second user's read-write access status to the authenticated component by checking with the access profile;

transmitting the authenticated component to the second user; and changing the access profile to indicate that the authenticated component is checked out to the second user.

23. The method of claim 22, wherein the method further comprises:

receiving the authenticated component with a first change from the first user;

receiving the authenticated component with a second change from the second user;

determining that the first change does not conflict with the second change;

updating the access profile to indicate the authenticated component is checked in by the first user and checked in by the second user; and storing the authenticated component including both the first change and the second change.

24. The method of claim 22, wherein the method further comprises:

receiving the authenticated component with a first change from the first user;

receiving the authenticated component with a second change from the second user;

determining that the first change conflicts with the second change;

transmitting a query to the first user and the second user inquiring whether the first change or the second change should be incorporated into the authenticated component.

25. The method of claim 22, wherein the method further comprises:

receiving the authenticated component with a first change from the first user;

receiving the authenticated component with a second change from the second user;

determining that the first change conflicts with the second change;

if the first user has a higher access level than the second user to the authorized component, then storing the authenticated component including only the first change;

if the second user has a higher access level than the first user to the authorized component, then storing the authenticated component including only the second change; and if the first user has the same access level as the second user to the authorized component, then storing two separate versions of the authenticated component; wherein a first version includes only the first change and a second version includes only the second change.

26. A computer system according to claim 1, wherein the method further comprises:

removing one or more unauthorized components of the electronic document prior to transmitting the electronic document to the user.

\* \* \* \* \*